(12) United States Patent
Wu

(10) Patent No.: US 6,584,228 B1
(45) Date of Patent: Jun. 24, 2003

(54) IMAGE CODING EMBEDDED IN MATRIX OPERATION

(75) Inventor: Jiann-Shong Wu, Kaohsiung Hsien (TW)

(73) Assignee: Avxing International Ltd. Cayman, Grand Cayman (KY)

( * ) Notice: Subject to any disclaimer, the term of this patent is extended or adjusted under 35 U.S.C. 154(b) by 582 days.

(21) Appl. No.: 09/598,183

(22) Filed: Jun. 21, 2000

Related U.S. Application Data

(60) Provisional application No. 60/200,482, filed on Apr. 28, 2000.

(51) Int. Cl.[7] ................................................ G06K 9/36
(52) U.S. Cl. ....................................................... 382/240
(58) Field of Search .............................. 382/232, 236, 382/238, 240, 242, 248, 250; 348/384.1, 394.1–395.1, 400.1–404.1, 407.1–416.1, 420.1–421.1, 425.2, 430.1, 431.1; 341/51, 63, 65, 67, 79, 107; 375/240.02–240.03, 240.11–240.16, 240.18–240.2, 240.22–240.25; 708/203, 300, 307–308, 313, 316–317, 400–405

(56) References Cited

U.S. PATENT DOCUMENTS

| | | | | |
|---|---|---|---|---|
| 5,412,741 A | * | 5/1995 | Shapiro | 382/232 |
| 5,748,786 A | * | 5/1998 | Zandi et al. | 382/240 |
| 5,758,092 A | * | 5/1998 | Agarwal | 395/200.77 |
| 5,995,080 A | * | 11/1999 | Biro et al. | 345/154 |
| 6,310,973 B1 | * | 10/2001 | Persiantsev et al. | 382/232 |
| 6,370,197 B1 | * | 4/2002 | Clark et al. | 375/240.19 |
| 6,466,698 B1 | * | 10/2002 | Creusere | 382/240 |
| 6,483,543 B1 | * | 11/2002 | Zhang et al. | 348/390 |
| 6,493,023 B1 | * | 12/2002 | Watson | 348/180 |
| 6,529,868 | * | 3/2003 | Chandran et al. | 704/226 |

* cited by examiner

Primary Examiner—Jose L. Couso
(74) Attorney, Agent, or Firm—J. C. Patents

(57) ABSTRACT

An image coding embedded in matrix operation. A sorting and refining processes are merged, based on matrix and the stream control mechanism, a novel concept for embedded image compression in a single stage is achieved. A significant map array is used to determine whether the node in a hierarchic tree is significant to ensure and enhance the compression efficiency. A status bit coding processing apparatus employing the above method is based on a simple algorithm logic to require only one and a quarter memory space of an image transform coefficient. The design of the bit budget controller further overcome the conflict between the embedded type and matrix type coding to ensure a high efficient compression well suited for the implementation of low cost hardware chip or DSP chip.

12 Claims, 3 Drawing Sheets

IMAGE CODING EMBEDDED IN MATRIX OPERATION

CROSS-REFERENCE TO RELATED APPLICATION

This application claims the priority benefit of provisional application filed on Apr. 28, 2000, title "ARRAY-BASED EMBEDDED IMAGE CODER", and the Ser. No. 60/200,482.

BACKGROUND OF THE INVENTION

1. Field of the Invention

The invention relates in general to an image coding method. More particularly, this invention relates to a method and an operation apparatus of image compression coding embedded in matrix operation.

2. Description of the Related Art

In the recent years, as the development of mobile phone and internet becomes more and more advanced, the data transmitted to the computer or the mobile phone via cable or wireless network is more and more enormous. In addition to text data, the transmitted data further comprise audio or video information. The multimedia products that transceive the massive audio-video information are thus very popular. How to enhance the performance of signal transmitting and the economic efficiency becomes an important topic in industry.

It is well known that the multi-medium signal may include image, speech and various data signals. Generally speaking, the image signal is the most magnificent one among all the signals. For example, the image signal requires a speed of 3 Mbits/sec. (bps) for transmission, the speech signal requires only a speed of 64K bps for transmission. For the massive data of the speech or image signal, a compression operation is required for transmission or storage to save the memory space and the usage of communication bandwith, so as to enhance the transmitting and processing speed.

Among the current methods and standards for digital-type signal compression/decompression, the motion picture expert group (MPEF) standard, no matter MPEG-I or MPEG-II, is the most commonly applied standard for animation in multi-medium industry. Regarding the still image, JPEG is the common standard for compression/decompression. Both the MPEG and JPEG compression operation methods with a high compression ratio comprise three stages of operation. These three stages include transform, quantization and coding. The method of quantization comprises at least a bit-discard method for specific threshold value and sorting method.

In a conventional wavelet image compression algorithm, a zero-tree data structure of wavelet transform coefficient is used to accommodate a bit plane coding technique to obtain a data stream with a high compression ratio and embedded properties. This kind of embedded wavelet compression image data stream includes the advantages of progressive transmission, precision in controlling coding length and error tolerance. Particularly, the precision in controlling the coding length cannot be achieved by simply using bit-discard method. In the current network application, a real time transmission of image data between hetero-networks is highly demanded. The technique of quality of service (QoS) plays a crucial role. Only with a precise control of image coding length and quality of compression algorithm, the requirement of controlling QoS can be met. Under such circumstance, the embedded wavelet image compression technique plays an important role in the field of image communication.

To obtain an image frame with a real time compression high resolution, or to compress the image frame applying both high compression ratio and real time transmission, the digital signal processing (DSP) chip capable of running firmware program or hardware of a very large scaled integrated circuit (VLSI) is implemented. The current commercial wavelet compression system, especially the VLSI chip employing the conventional bit-discard method, does not use the modern embedding coding method. Therefore, the commercial DSP chip or VLSI chip cannot meet the requirement of QoS control.

In the embedded image coding theory, the sorting operation is performed on the transform coefficient after the stage of wavelet transform. The quantization is performed with accommodating the bit plane coding method. During the coding process, to accelerate the sorting operation and to enhance the compression efficiency, a conventional wavelet image compression algorithm is applied to a zero tree structure based on the relationship between the frequency and time domains of the wavelet transform coefficient. In fact, two lists, a dominant list and a subordinate list have to be maintained for the above algorithm. Firstly, all the wavelet transform coefficients are saved into the dominant list in a predetermined order. In the main operation procedure, the dominant list is scanned. With the zero tree as the common structure base at the two ends of the code, for all the coefficients with the absolute values are no less than the initial threshold value $T_0$, the coordinates and the positive and negative signs thereof are coded (sorted). The coefficients are then shifted to the subordinate list. The original coefficients are erased to zero to ensure that there is no coding performed in the major operation procedure. In the subordinate operation procedure, the subordinary bit of all the coefficients in the subordinate list are coded (sorted) and output. By decreasing the threshold values into a half, the previous coding procedure is repeated until the code length is run out, or until reaching the minimum threshold value $T_{min}$.

Due to the enormous memory and time expenditure for list operation, it is difficult to implement a low-cost embedded image hardware which adopts the conventional algorithm. More importantly, the memory space for list or tree structures is much larger than that of the conventional bit-discard method, the design difficulty and production cost are further increased.

SUMMARY OF THE INVENTION

The invention provides an image coding embedded in matrix operation (ICEM) and the status bit coding apparatus employed by the image coding. The advantages of progressive transmission, the precision in controlling the coding length are achieved to thoroughly adjust QoS of the network image transmission. More particularly, the used memory space is small and fixed, and the coding speed is accelerated to be well suitable for hardware implementation.

In the image coding embedded in matrix operation, a wavelet transform is performed on a pixel data to obtain a transform coefficient array. The DV gain in the transform coefficient array is removed. The transform coefficient array is scanned to construct a significant map array and a plurality of scaling auxiliary array. According to the scaling auxiliary array, the evaluated bit usage consumed by coding is estimated. Before the evaluated bit image reaches a coding warning value, an ICEM normal processing is performed according to the significant map array, followed by jumping to the foregoing step of estimating the evaluated bit usage. When the evaluated bit image reaches or exceeds the bit warning value, an ICEM final processing is executed according to the significant map array.

The above coding processing includes the following steps. By an array sequential scanning method and accommodating a bit plane coding method, the transform coefficient array is scanned. When $L=L_{max}$, the status bits P, S, R are coded unconditionally. When $L=L_{max-1}$ the status bits P, S, R, C are coded unconditionally, and when $L<L_{max-1}$ and $L>1$, the status bit P, S, R, C coded according to $C_{ij}$ that is possibly the significant. The foregoing ICEM final processing includes the following steps. Using the array sequential scan and the bit plane coding, the above transform coefficient array is scanned. The coding status bit P, S are coded according to the above signal map array. When the actual consumed bit usage for coding does not reach the coding estimated value, status bits P, S, C of the residual transform coefficient are coded. When the actual bit usage for coding does not reach the coding estimated value, the status bit R is coded.

The coding logic for status bit P, S is:
If $|C_{ij}|<2T$
   If $|C_{ij}|\geq T$
     P=1
     If $C_{ij}>0$
       S=0
     Else
       S=1
   Else
     P=0

The logic for determining the status bit R:
If $|C_{ij}|\geq 2T$
   If $|C_{ij}|$ & T
     R=1
   Else
     R=0

The logic for determining the status C:
If $MAXMAG_{ij}<2T$
   If $MAXMAG_{ij}\geq T$
     C=1
   Else
     C=0

Wherein
The status bit P is the significant bit of mother tree.
The status bit S is the sign bit of the mother tree.
The status bit R is the refinement bit of the mother tree.
The status bit C is the significant bit of the subtree.
$C_{ij}$ is the transform coefficient at the coordinate (i, j).
$MAXMAG_{ij}$ is the maximum absolute value of the node located at (i, j) of the subtree.
T is the threshold value.
L is the level, $L_{max}$ locates at the highest level of the hierarchical tree, and $L_{min}$ locates at the lowest level of the hierarchic tree.

The transform coefficient are scanned with the array sequential scanning method and the following formula are applied recursively to obtain the scaling auxiliary array:

$M[T_n]$=count of $\{C_{ij}|T_n|<=|C_{ij}|<T_{n-1}\}$ $MM[T_n]$=count of $\{MAXMAG_{ij}|T_n<=|MAXMAG_{ij}|T_{n-1}\}$ $MM2[T_n]$=count of $\{MAXMAG_{ij}|T_n|<=|MAXMAG_{ij}|<T_{n-1}, L>1|\}$ The evaluated bit image consumed by estimating coding can be obtained by the following formula:

$P_n=P_{n-1}+MM[T_n]\cdot 4-M[T_{n-1}]$ $S_n=M[T_n]$ $R_n=R_{n-1}+M[T_{n-1}]$ $C_n=C_{n-1}+MM2[T_n]\cdot 4-MM[T_{n-1}]$ Wherein
$M[T_n]$, $MM[T_n]$, $MM2[T_n]$ are scaling auxiliary array.
$C_{ij}$ is the maximum absolute value of the node located at (i, j) of the subtree.
$T_n$ is threshold value of the nth iteration.
L is the level.
$P_n$, $S_n$, $R_n$, $C_n$ are the maximum coding length of the plurality of status bits P, S. R, C at the threshold values $T_n$.

In another embodiment of the invention, a status bit coding apparatus is provided. A significant bit filter uses an array sequential scanning method and the bit plane coding method to continuously scan the transform coefficient array. The possibly significant transform coefficient is output. The status bit P coding unit is coupled to the significant bit filter to code the above possibly significant transform coefficient as the status bit P. The status bit S coding unit is coupled to the significant bit filter to code the above possibly significant transform coefficient into the status bit S. The status bit C coding unit is coupled to the significant bit filter to code the above possibly significant transform coefficient into the status bit C. A bit budget controller is coupled to the status bit R coding unit and the status bit C coding unit to estimate the consumed evaluated bit usage for coding. When the evaluated coding usage reaches a warning value, the status bit R coding unit and the status bit C coding unit are controlled to stop coding status bits R, C.

The method of matrix-type image coding merges sorting and refinement processes based on an array and accommodate the stream control mechanism to achieve a novel concept for embedded image compression within a single stage. The status bit coding apparatus uses a simple algorithm logic, for example, comparison and logic computation, so that a small and fixed memory is required to accomplish and accelerate the embedded image compression in a singe stage. The design of bit budget control further enhances the compression efficiency. This is thus particular suitable for implementation of VLSI chip hardware or DSP chip firmware.

Both the foregoing general description and the following detailed description are exemplary and explanatory only and are not restrictive of the invention, as claimed.

DESCRIPTION OF THE PREFERRED EMBODIMENTS

Currently, for image compression/decompression, the RGB data format is not used for the compression process.

Instead, $YC_rC_b$ or YUV is used as the data processing format. This is because human being is more sensitive of contrast compared to chromatics and saturation. Using the $YC_rC_b$ or YUV format for compression, a high image data processing efficiency can be obtained, and the image processing is straightforward. It is the same in one preferred embodiment of the invention. If the pixel data is not in a $YC_rC_b$ or YUV data format, for example, is an RGB data format, the pixel data has to be converted into the $YC_rC_b$ or YUV data format first, followed by the processing step for transform stage. In the invention, the wavelet transform algorithm including versatile advantages is employed in the transform stage.

Figures 1, 2:
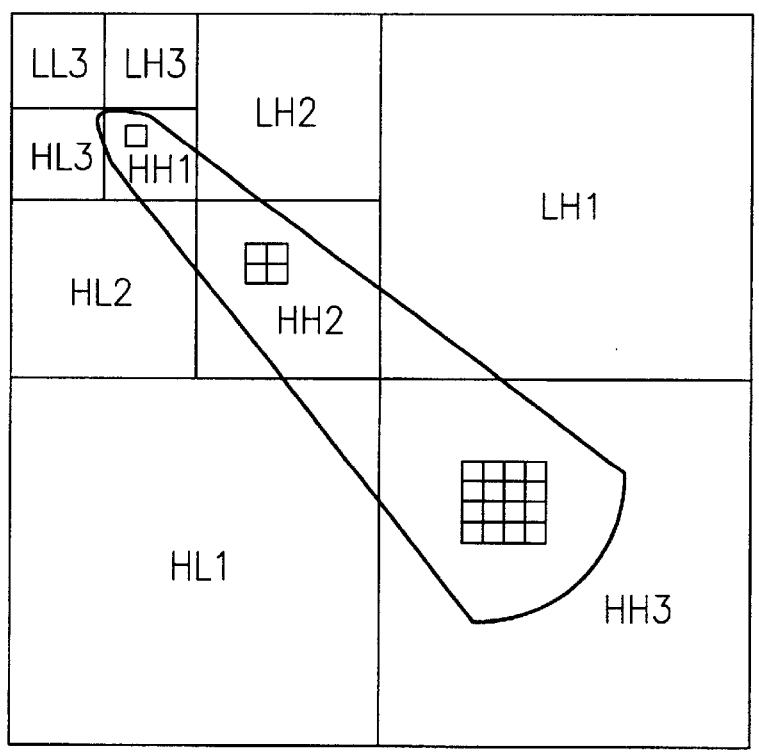
FIG. 1 shows a diagram for using bit plane coding method to achieve a progressive transmission.
FIG. 2 shows a triadic hierarchic tree after wavelet transform.

FIG. 1 shows a method of bit plane coding method to achieve the progressive transmission. In FIG. 1, each row represents a transform coefficient after wavelet transform. The transform coefficients have been sorted according to their magnitude, that is, the transform coefficients are degressive from the top row to the bottom row. Each column represents a bit plane. If absolute value of the error of the transform coefficient caused by coding is equivalent to the actual pixel error, according to the transmission bandwidth, the sorted transform coefficients are output sequentially. The data stream thus comprises the advantages of embedded properties, progressive transmission, precision in controlling coding length, and error tolerance.

The actual coding further includes two steps. According to certain threshold value, coefficient with an absolute value no less than the threshold value, that is, the bit plane denoted by 1 in FIG. 1, that is, the significant coordinate (the status bit P, C in the ICEM method of the invention) is indirectly output according to the zero tree structure. The sign bit is directly output (the status bit S in the ICEM method of the invention). The previous output significant coefficient is directly output with the bit located at the current bit plane, that is, the reference notation R in FIG. 1 (the status bit R in the ICEM method of the invention). From the above description, the relationship between the embedded coding and bit plane coding can be realized. The embodiment employs the bit plane coding method.

FIG. 2 shows a diagram of a triadic hierarchic tree obtained from the wavelet transform. In addition to the properties in the frequency domain, the coefficient array further has a spatial ratio relationship between the upper and lower level of an identical frequency band. That is, the coefficient node in a scale has four children, which correspond to the wavelets at the next finer scale having the same location in space. This particular relationship between the frequency and time domains is called the hierarchic tree. The concept of hierarchic plays a very important role in the coding theory of the invention. Since a large amount of zero trees with a zero value can be found, the subtree based on the zero tree does not need further computation and operation. The compression ratio can thus be enhanced, and the unnecessary decision is not required to accelerate the coding.

Figure 3:
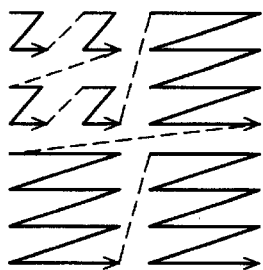
FIG. 3 shows a scanning path using an array sequential scanning method.

FIG. 3 shows a scanning path for an array sequential scanning method. The conventional coding method employs the list with sorting process, that is, the precise two-stage alternate coding. However, the ICEM method used in the invention employs the above hierarchic tree concept, as shown as the array sequential scanning method in FIG. 3, and the bit plane coding method to accomplish the coding processing within one stage.

Figure 4:
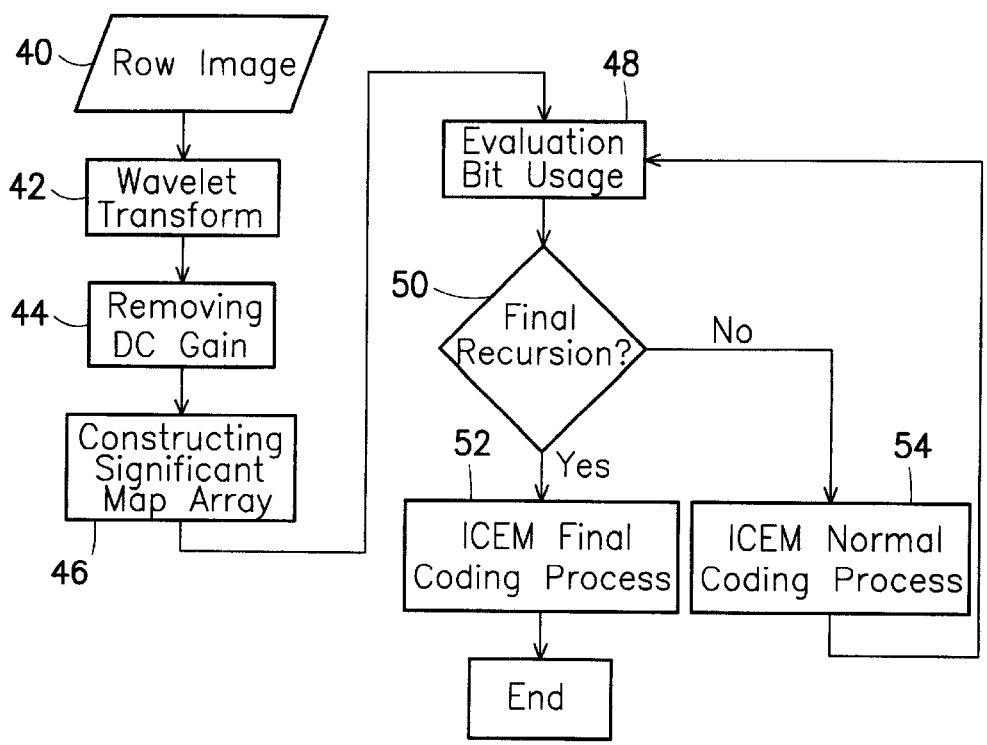
FIG. 4 is a flow chart showing image coding method embedded in a matrix operation.

FIG. 4 is a flow chart showing an image coding method embedded in matrix operation. The method includes the following steps.

In step 42, a wavelet transform is performed on the pixels data of the image 40 to obtain a transform coefficient array. In step 44, the DC grain in the coefficient array is removed. Typically, the method of the mean value computation is used to remove the DC grain. Based on the frequency domain properties of wavelet transform and the concept of hierarchic tree, the upper left corner of the array coefficient is removed to remove the DC grain, that is, the node of mother tree with the lower frequency is remained. The step 46 is then performed to scan the coefficient array, so as to build up a significant map array and a plurality of scaling auxiliary array.

The significant map array is used to find out which is the zero tree. The significant map array can be constructed according to the array sequential scanning method in FIG. 3 to scan the transform coefficient array with the following formula to recursively construct the significant map array:

$$MAXMAG_{i,j} = \max \begin{Bmatrix} |C_{2i,2j}|, |C_{2i+1,2j}|, |C_{2i,2j+1}|, |C_{2i+1,2j+1}|, \\ MAXMAG_{2i,2j}, MAXMAG_{2i+1,2j}, \\ MAXMAG_{2i,2j+1}, MAXMAG_{2i+1,2j+1} \end{Bmatrix} \quad (1)$$

Wherein:
$C_{ij}$ is the transform coefficient at the coordinate (i, j) in the transform coefficient array.
$MAXMAG_{ij}$ is the maximum absolute value of the node located at (i, j) in the subtree.

The scaling auxiliary array is mainly applied to estimation of the required bit length for coding each status bit (the data bit after coding) in each recursion. The construction of the above scaling auxiliary array uses the array sequential scanning method to scan the transform coefficient array with the formula:

$M[T_n]$=count of $\{C_{ij}|T_n<=|C_{ij}|<T_{n-1}\}$ $MM[T_n]$=count of $\{MAXMAG_{ij}|T_n<=|MAXMAG_{ij}|<T_{n-1}\}$ $MM2[T_n]$=count of $\{MAXMAG_{ij}|T_n<=|MAXMAG_{ij}|<T_{n-1}, L>1\}$(2)

Wherein $M[T_n]$, $MM[T_n]$, $MM2[T_n]$ are the scaling auxiliary array $C_{ij}$ is the transform coefficient of transform coefficient array at (i, j)

$MAXMAG_{ij}$ is the maximum absolute value of the node of the subtree located at (i, j)

$T_n$ is the threshold value of the nth recursion

L is the level number.

The scaling auxiliary array can thus be built up recursively. In this stage, only tens of storing spaces of the memory is used for the scaling auxiliary array. The significant map array can be used, while the relative array element is computed. The obtained resultant array does not need to be computed by the equation (2) in each recursion. The coding end does not require the computation of equation (2) either.

The step 48 is performed. According to the scaling auxiliary arrays, the evaluated bit usage consumed by the coding processing is estimated. The purpose of estimating the coding length for each status bit is to predict when the coding processing is finished. In the final processing recursion, the transmission ratio for each status bit is distributed according to the residual coding budget. By this manner of optimization, the ICEM method in the invention can maintain a high compression under the estimation of coding length budget. The estimation of the evaluated bit image consumed by coding can be computed by the formula:

$$P_n = P_{n-1} + MM[T_n] \cdot 4 + M[T_n]$$

$$S_n = M[T_n]$$

$$R_n = R_{n-1} + M[T_{n-1}]$$

$$C_n = C_{n-1} + MM2[T_n] \cdot 4 - MM[T_{n-1}] \quad (3)$$

Wherein $M[T_n]$, $MM[T_n]$ $Mm2[T_n]$ are the scaling auxiliary array.

$T_n$ is the threshold value of the nth recursion.

$P_n$, $S_n$, $R_n$, $C_n$ are the required maximum coding length when the status bit P, S, R and S are at the threshold values, respectively.

Since the end of the coding process can be predicted, the subsequent ICEM coding operation can be separated into to a final coding processing path 52 and a normal coding processing path 54. In step 50, whether the coding process is the final recursion is decided. If it is not the last recursion, that is, if the coding warning value is not reached, the step 54, the normal coding process 54 is executed according to the significant map array, followed by jumping to the step 48 for estimating the above evaluation bit usage. If the final recursion is reached, the evaluated bit image exceeds the coding warning value, the final coding process 52 is performed according to the significant map array. It is worth noting that for the actual hardware implementation, as long as the register achieves the objective of controlling stream of each status bit, two streams can be combined into one.

The above coding process 54 comprises the following steps. Using the array sequential scanning method with the bit plane coding method, the above transform coefficient array is scanned. When $L=L_{max}$, the status bits P, S, R are coded unconditionally. When $L=L_{max-1}$, the status bits P, S, R, C are coded unconditionally. When $L<L_{max-1}$ and $L>1$, the P, S, R, C are coded according to the possibly significant $C_{ij}$. The final coding process 52 also including the following steps. An array sequential scanning method with a bit plane coding method is performed to scan the above transform coefficient. Using the MAXMAG significant map array in the current decoding end (the coded results are to be decoded by the decoding end), the status bits P, S are coded. When the actual consumed bit usage for coding reaches the coding budge, the status bit C is coded. Meanwhile, the MSXAMG array at the decoding end is refreshed synchronously, and the status bits P, S of the residual transform coefficient which is not transmitted are coded. When the actual consumed bit usage required by coding does not reach the estimated coding value is judged, the status bit is C is coded.

The above decision logic is:

If $|C_{ij}|<2T$
   If $|C_{ij}|\geq T$
     P=1
     If $C_{ij}>0$
       S=0
     Else
       S=1
   Else

P=0      (4)

The logic for judging the status bit R is:

If $|C_{ij}|\geq 2T$
   If $|C_{ij}|$ & T
     R=1
   Else

R=0      (5)

The logic for judging the status C is:

If $MAXMAG_{ij}<2T$
   If $MAXMAG_{ij}\geq T$
     C=1
   Else

C=0      (6)

Wherein

The status bit P is the significant bit of mother tree.

The status bit S is the sign bit of the mother tree.

The status bit R is the refinement bit of the mother tree.

The status bit C is the significant bit of the subtree.

$C_{ij}$ is the transform coefficient at the coordinate (i, j).

$MAXMAG_{ij}$ is the maximum absolute value of the node located at (i, j) of the subtree.

T is the threshold value.

L is the scale, $L_{max}$ locates at the highest scale of the hierarchical tree, and $L_{min}$ locates at the lowest scale of the hierarchic tree.

Figure 5:
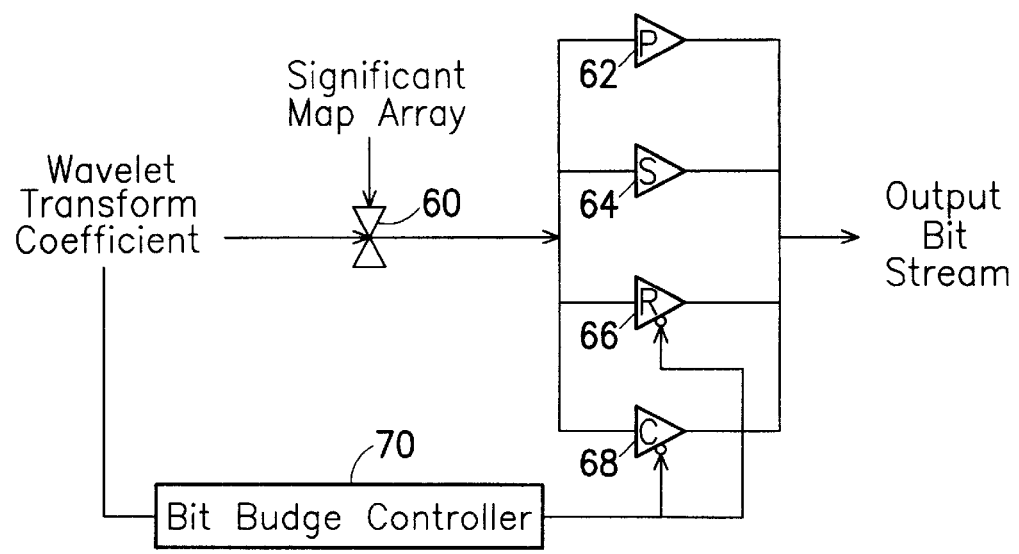
FIG. 5 is a block diagram showing a status bit coding apparatus.

FIG. 5 shows a block diagram of a status bit coding apparatus. By applying the above image coding embedded in matrix, a status bit coding processing apparatus is provided. A significant bit filter 60, a status bit P coding unit 62, a status bit S unit 64, a status bit R coding unit 66, a status bit C coding unit 68 and a bit budget controller 70 are included.

The significant bit filter 60 consecutively scans the transform coefficient using the array sequential scanning method as shown in FIG. 3 with the bit plane coding method. According to specific design, the output may be significant transform coefficient. The status bit P, S, R, C coding units 62, 64, 66, 68 are coupled to the significant bit filter 60. According to the judging logic of formula (4), (5) and (6), the above possibly significant transform coefficients are coded into the status bits P, S, R, C.

The bit budget controller 70 is a characteristic feature of the invention. The bit budget controller 70 is coupled to the status bit coding units R and C. According to the formula (2) and (3), the evaluated bit usage consumed by coding is estimated. When it is judge that the final recursion is not reached, that is, the evaluation bit usage does not reach the coding warning value, a normal coding process is performed. Otherwise, a final coding step is performed according to the significant map array. That is, the status bits R and C coding units are controlled to stop coding the status bits R and C.

The invention uses a relatively small and fixed array space, by merging sorting and refining process into one simplified array computation logic, to achieve high efficient compression. In fact, there is a process conflict between the embedding coding technique and the array sequential computation. Especially for the final recursion of the coding processing procedure, the bit information to be output in the original plan has to be output with priority, so that that compression performance can be enhanced. Thus, the ICEM algorithm also provides an estimation and a control mechanism of the status bit length, that is, the bit budget controller to ensure a highest compression efficiency.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of image coding embedded in matrix operation, comprising:

performing a wavelet transform on a pixel data to obtain a transform coefficient array;

removing a DC grain in the transform coefficient array;

constructing a significant map array and a plurality of scaling auxiliary array;

estimating an evaluated bit usage required by coding according to the scaling auxiliary array;

performing a normal coding process before the evaluated bit usage reaches a coding warning value, then going back to the step of estimating the evaluated bit usage; and performing a final coding process when the evaluated bit usage reaches the coding warning value according to the significant map array.

2. The method according to claim 1, wherein the step of performing the normal coding process further comprises the steps of:

using an array sequential scanning method with a bit plane coding method to consecutively scan the transform coefficient array;

coding a plurality of status bits P, S, R unconditionally when $L=L_{max}$;

coding the status bits R, S, P and another status bit C unconditional when $L=L_{max-1}$; and coding the status bit P, S, R, C according to $C_{ij}$ which is possible to be significant; wherein:

a decision logic of the status bit P, S comprises:

If $|C_{ij}|<2T$
  If $|C_{ij}|\geq T$
    P=1
    If $C_{ij}>0$
      S=0
    Else
      S=1
  Else
    P=0 the logic for judging the status bit R is:

If $|C_{ij}|\geq 2T$
  If $|C_{ij}|\& T$
    R=1
  Else
    R=0 the logic for judging the status C is:

If $MAXMAG_{ij}<2T$
  If $MAXMAG_{ij}\geq T$
    C=1
  Else
    C=0 the status bit P is the significant bit of mother tree;
the status bit S is the sign bit of the mother tree;
the status bit R is the refinement bit of the mother tree;
the status bit C is the significant bit of the subtree;
$C_{ij}$ is the transform coefficient located at the coordinate (i, j);
$MAXMAG_{ij}$ is the maximum absolute value of a node located at (i, j) of the subtree;
T is the threshold value; and
L is the scale, $L_{max}$ locates at the highest scale of a hierarchical tree, and $L_{min}$ locates at the lowest scale of the hierarchic tree.

3. The method according to claim 1, wherein the step of performing the final coding process further comprises:

using an array sequential scanning method with a bit plane coding method to consecutively scan the transform coefficient array;

coding a plurality of status bits P, S according to the significant map array;

coding the status bits P, S and another status bit C of a residual transform coefficient when the actual bit usage consumed by coding does not reaching a coding budget; and coding a status bit R when the actual bit usage consumed by coding reaches the coding budget; wherein:

the logic of the status bits P, S includes:

If $|C_{ij}|<2T$
  If $|C_{ij}|\geq T$
    P=1
    If $C_{ij}>0$
      S=0
    Else
      S=1
  Else
    P=0 the logic for judging the status bit R is:

If $|C_{ij}|\geq 2T$
  If $|C_{ij}|\& T$
    R=1
  Else
    R=0 the logic for judging the status C is:

If $MAXMAG_{ij}<2T$
  If $MAXMAG_{ij}\geq T$
    C=1
  Else
    C=0 wherein
the status bit P is the significant bit of mother tree;
the status bit S is the sign bit of the mother tree;
the status bit R is the refinement bit of the mother tree;
the status bit C is the significant bit of the subtree;
$C_{ij}$ is the transform coefficient at the coordinate (i, j);
$MAXMAG_{ij}$ is the maximum absolute value of the node located at (i, j) of the subtree;
T is the threshold value; and
L is the scale, $L_{max}$ locates at the highest scale of the hierarchical tree, and $L_{min}$ locates at the lowest scale of the hierarchic tree.

4. The method according to claim 1, wherein the step of constructing the scaling auxiliary array comprises the following step:

using an array sequential scanning method to scan the transform coefficient array, and using the following formula to recursively construct the scaling auxiliary array:

$M[T_n]$=count of $\{C_{ij}|T_n<=|C_{ij}|<T_{n-1}\}$ $MM[T_n]$=count of $\{MAXMAG_{ij}<|T_n<=|MAXMAG_{ij}|<T_{n-1}\}$ $MM2[T_n]$=count of $\{MAXMAG_{ij}|T_n<=|MAXMAG_{ij}|<T_{n-1}, L>\}$ wherein
$M[T_n]$, $MM[T_n]$, $MM2[T_n]$ are the scaling auxiliary array;
$C_{ij}$ is the transform coefficient of transform coefficient array at (i, j);

MAXMAG$_{ij}$ is the maximum absolute value of the node of the subtree located at (i, j); and T$_n$ is the threshold value of the nth recursion;

L is the level number.

5. The method according to claim 1, wherein the step of estimating the evaluation bit usage consumed by coding is performed according to the following formula:

$$P_n = P_{n-1} + MM[T_n] \cdot 4 + M[T_n]$$

$$S_n = M[T_n]$$

$$R_n = R_{n-1} + M[T_{n-1}]$$

$$C_n = C_{n-1} + MM2[T_n] \cdot 4 - MM[T_{n-1}] \quad (3)$$

wherein

M[T$_n$], MM[T$_n$] Mm2[T$_n$] are the scaling auxiliary array;

T$_n$ is the threshold value of the nth recursion; and P$_n$, S$_n$, R$_n$, C$_n$ are the required maximum coding length when the status bit P, S, R and S are at the threshold values, respectively.

6. The method according to claim 1, wherein the step of constructing the significant map array comprising the follow steps:

using an array sequential scanning method to scan the transform coefficient array; and using the following formula to recursively construct the significant map array:

$$MAXMAG_{i,j} = \max \begin{Bmatrix} |C_{2i,2j}|, |C_{2i+1,2j}|, |C_{2i,2j+1}|, |C_{2i+1,2j+1}|, \\ MAXMAG_{2i,2j}, MAXMAG_{2i+1,2j}, \\ MAXMAG_{2i,2j+1}, MAXMAG_{2i+1,2j+1} \end{Bmatrix}$$

wherein:

C$_{ij}$ is the transform coefficient at the coordinate (i, j) in the transform coefficient array; and MAXMAG$_{ij}$ is the maximum absolute value of the node located at (i, j) in the subtree.

7. A status bit coding processing apparatus, comprising:

a significant bit filter, continuously scanning a transform coefficient array to output a significant transform coefficient using an array sequential scanning method with a bit plane coding process;

a status bit P coding unit, coupled to the significant bit filter to code the possibly significant transform coefficient into a status bit P;

a status bit S coding unit, coupled to the significant bit filter to code the possibly significant transform coefficient into a status bit S;

a status bit R coding unit, coupled to the significant bit filter to code the possibly significant transform coefficient into a status bit R;

a status bit C coding unit, coupled to the significant bit filter to code the possibly significant transform coefficient into a status bit C; and a bit budget controller, coupled to the status bit R coding unit and the status bit C coding unit to estimate an evaluation bit usage consumed by coding, and when the evaluation bit usage reaching a coding warning value, controlling the status bit R coding unit and the status bit C coding unit to select stop coding the status bits R, C.

8. The apparatus according to claim 7, wherein when the evaluation bit usage reaches the coding warning value, the significant bit filter outputs the possible significant transform coefficient, and the status bits P, S, R, C coding units code the status bits P, S, R, S according to the following rules:

when L=L$_{max}$, coding the status bits P, S, R unconditionally;

when L=L$_{max-1}$, coding the status bits P, S, R, C unconditionally;

when L<L$_{max-1}$ and L>1, coding the status bits P, S, R, C according to the possible significant C$_{ij}$; and a judging logic for status bit P, S comprising:
  If |C$_{ij}$|<2T
  If |C$_{ij}$|≧T
    P=1
    If C$_{ij}$>0
      S=0
    Else
      S=1
  Else
    P=0 the logic for judging the status bit R comprising:
  If |C$_{ij}$|≧2T
  If |C$_{ij}$|& T
    R=1
  Else
    R=0 the logic for judging the status C comprising:
  If MAXMAG$_{ij}$<2T
  If MAXMAG$_{ij}$≧T
    C=1
  Else
    C=0 the status bit P is the significant bit of mother tree;

the status bit S is the sign bit of the mother tree;

the status bit R is the refinement bit of the mother tree;

the status bit C is the significant bit of the subtree;

C$_{ij}$ is the transform coefficient located at the coordinate (i, j);

MAXMAG$_{ij}$ is the maximum absolute value of a node located at (i, j) of the subtree;

T is the threshold value; and

L is the scale, L$_{max}$ locates at the highest scale of a hierarchical tree, and L$_{min}$ locates at the lowest scale of the hierarchic tree.

9. The apparatus according to claim 7, wherein when the evaluation bit usage reaches a coding warning value, the status bits P, S are obtained by coding in the status bits P, S coding units, and the status bits R, C are controlled by the bit budget controller to code the status bits R, C according to the following formula:

a judging logic for status bit P, S comprising:
  If |C$_{ij}$|<2T
  If |C$_{ij}$|≧T
    P=1
    If C$_{ij}$>0
      S=0
    Else
      S=1
  Else
    P=0 the logic for judging the status bit R comprising:
  If |C$_{ij}$|≧2T
  If |C$_{ij}$|& T

```
    R=1
Else
    R=0
```
the logic for judging the status C comprising:
```
If MAXMAG_ij<2T
    If MAXMAG_ij≧T
        C=1
    Else
        C=0
```
the status bit P is the significant bit of mother tree;
the status bit S is the sign bit of the mother tree;
the status bit R is the refinement bit of the mother tree;
the status bit C is the significant bit of the subtree;
$C_{ij}$ is the transform coefficient located at the coordinate (i, j);
$MAXMAG_{ij}$ is the maximum absolute value of a node located at (i, j) of the subtree;
T is the threshold value; and L is the scale, $L_{max}$ locates at the highest scale of a hierarchical tree, and $L_{min}$ locates at the lowest scale of the hierarchic tree.

10. The apparatus according to claim 7, wherein the bit budget controller estimates the evaluation bit usage consumed by coding and scan the transform coefficient array using array sequential scanning method to construct a plurality of scaling auxiliary array according to the formula:

$$M[T_n] = \text{count of } \{C_{ij} | T_n <= |C_{ij}| < T_{n-1}\}$$

$$MM[T_n] = \text{count of } \{MAXMAG_{ij} | T_n <= |MAXMAG_{ij}| < T_{n-1}\}$$

$$MM2[T_n] = \text{count of } \{MAXMAG_{ij} | T_n <= |MAXMAG_{ij}| < T_{n-1}, L>1|\}$$

wherein
$M[T_n]$, $MM[T_n]$, $MM2[T_n]$ are the scaling auxiliary array;
$C_{ij}$ is the transform coefficient of transform coefficient array at (i, j);
$MAXMAG_{ij}$ is the maximum absolute value of the node of the subtree located at (i, j); and
$T_n$ is the threshold value of the nth recursion;
L is the level number.

11. The apparatus according to claim 10, wherein the bit budget controller estimates the evaluation bit usage consumed by coding according to the formula:

$$P_n = P_{n-1} + MM[T_n] \cdot 4 + M[T_n]$$

$$S_n = M[T_n]$$

$$R_n = R_{n-1} + M[T_{n-1}]$$

$$C_n = C_{n-1} + MM2[T_n] \cdot 4 - MM[T_{n-1}] \quad (3)$$

wherein
$M[T_n]$, $MM[T_n]$ $Mm2[T_n]$ are the scaling auxiliary array;
$T_n$ is the threshold value of the nth recursion; and
$P_n, S_n, R_n, C_n$ are the required maximum coding length when the status bit P, S, R and S are at the threshold values, respectively.

12. The apparatus according to claim 7, wherein the transform coefficient array is scanned using the array sequential scanning method according to the formula:

$$MAXMAG_{ij} = \max \begin{cases} |C_{2i,2j}|, |C_{2i+1,2j}|, |C_{2i,2j+1}|, |C_{2i+1,2j+1}|, \\ MAXMAG_{2i,2j}, MAXMAG_{2i+1,2j}, \\ MAXMAG_{2i,2j+1}, MAXMAG_{2i+1,2j+1} \end{cases}$$

wherein:
$C_{ij}$ is the transform coefficient at the coordinate (i, j) in the transform coefficient array; and
$MAXMAG_{ij}$ is the maximum absolute value of the node located at (i, j) in the subtree.

* * * * *